US005492099A

United States Patent [19]

Maddock

[11] Patent Number: 5,492,099

[45] Date of Patent: Feb. 20, 1996

[54] CYLINDER FAULT DETECTION USING RAIL PRESSURE SIGNAL

[75] Inventor: James B. Maddock, Washington, Ill.

[73] Assignee: Caterpillar Inc., Peoria, Ill.

[21] Appl. No.: 369,841

[22] Filed: Jan. 6, 1995

[51] Int. Cl.[6] .......... F02M 47/02; F02B 77/00; G01M 15/00

[52] U.S. Cl. .......... 123/446; 123/198 D; 73/119 A

[58] Field of Search .......... 123/446, 457, 123/458, 479, 397, 198 D, 198 DB; 73/117.3, 119 A

[56] References Cited

U.S. PATENT DOCUMENTS

| | | | |
|---|---|---|---|
| Re. 33,270 | 7/1990 | Beck et al. | 123/446 |
| 4,487,184 | 12/1984 | Boning et al. | 123/425 |
| 4,615,306 | 10/1986 | Wakeman | 123/90.16 |
| 4,654,576 | 3/1987 | Oelsch et al. | 322/3 |
| 4,748,447 | 5/1988 | Oshizawa | 340/870.20 |
| 5,020,362 | 6/1991 | Hart et al. | 73/119 A |
| 5,107,700 | 4/1992 | Küttner et al. | 73/119 A |
| 5,188,079 | 2/1993 | Kondo | 123/414 |
| 5,191,867 | 3/1993 | Glassey | 123/446 |
| 5,222,394 | 6/1993 | Imai | 73/117.3 |
| 5,271,360 | 12/1993 | Kano et al. | 123/90.17 |
| 5,297,523 | 3/1994 | Hafner et al. | 123/446 |
| 5,313,924 | 5/1994 | Regueiro | 123/456 |
| 5,357,929 | 10/1994 | McCandless | 123/446 |

*Primary Examiner*—Thomas N. Moulis
*Attorney, Agent, or Firm*—R. Carl Wilbur

[57] ABSTRACT

An apparatus and method for sensing the failure of hydraulically-actuated electronically-controlled fuel injector in a combustion engine is disclosed. An electronic controller senses the pressure of the hydraulic actuator fluid prior to injection and samples the pressure throughout a subsequent injection cycle. If the samples show an oscillation in the pressure of the hydraulic actuator fluid, then the injector has fired. Otherwise, the injector has failed.

4 Claims, 2 Drawing Sheets

CYLINDER FAULT DETECTION USING RAIL PRESSURE SIGNAL

FIELD OF THE INVENTION

The present invention relates to hydraulically-actuated electronically-controlled fuel systems, and more specifically, to an apparatus and method for use with such a fuel system to sense failure of a fuel injector.

BACKGROUND OF THE INVENTION

An example of a hydraulically actuated electronically controlled unit injector fuel system is shown in U.S. Pat. No. 5,191,867 issued to Glassey on Mar. 9, 1993. The fuel system disclosed in Glassey includes pressurized hydraulic actuating fluid which is used to open the fuel injectors, thereby causing fuel to be injected into an engine cylinder. A hydraulic pressure sensor is included to sense the pressure of the hydraulic actuating fluid and allow the system to implement closed loop control of the hydraulic actuating fluid pressure.

Although the system disclosed in Glassey adequately controls the hydraulic fluid pressure, it does not provide a means for determining when a fuel injector has failed. It would therefore be preferable to provide a hydraulically actuated electronically controlled fuel system that is able to detect a fuel injector failure.

DETAILED DESCRIPTION OF A PREFERRED EMBODIMENT

The present invention relates to an electronic control system for use in connection with a hydraulically actuated electronically controlled unit injector fuel system. Hydraulically actuated electronically controlled unit injector fuel systems are known in the art. One example of such a system is shown in U.S. Pat. No. 5,191,867, issued to Glassey on Mar. 9, 1993, the disclosure of which is incorporated herein by reference.

Figure 1:
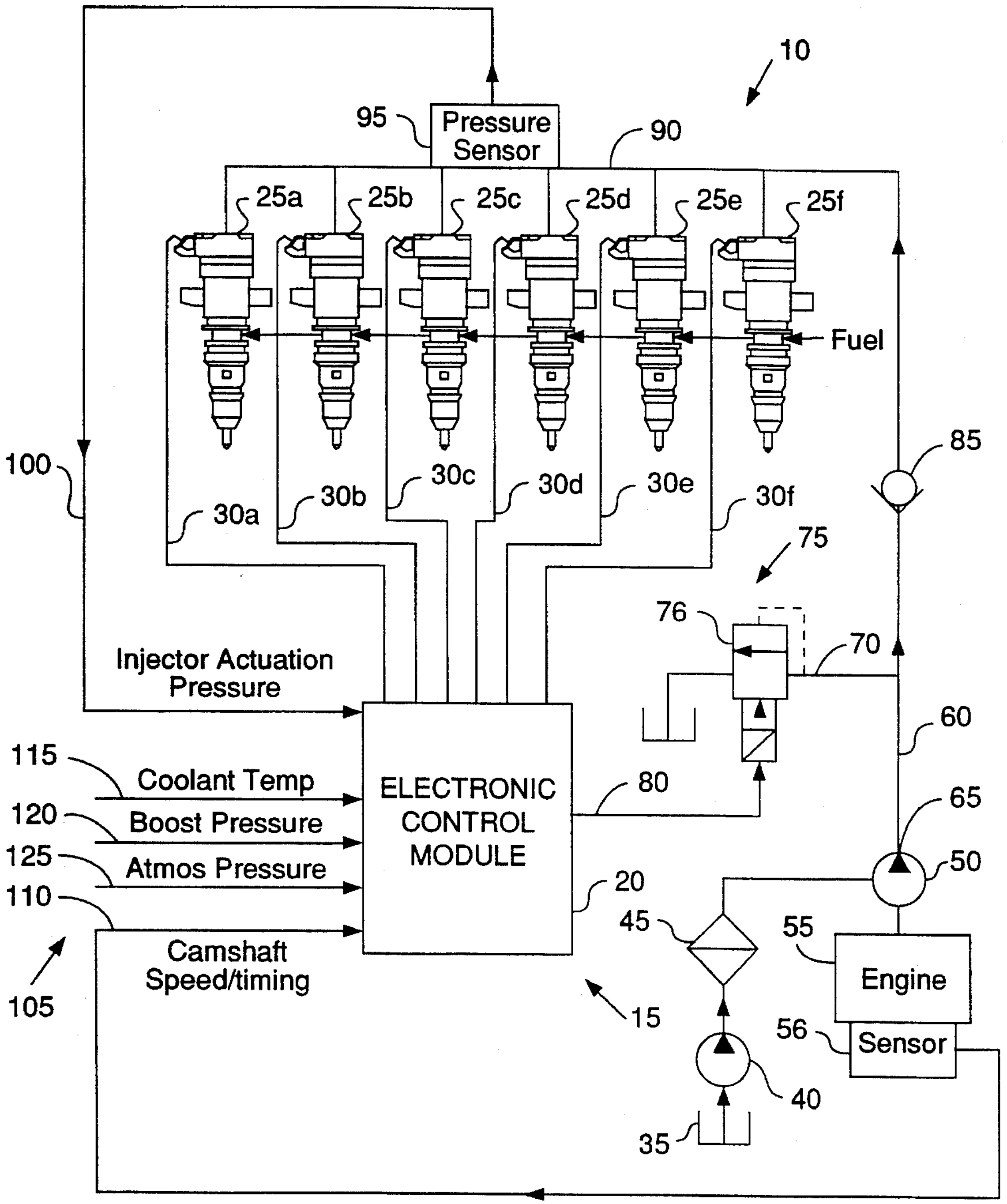
FIG. 1 illustrates in block diagram form a preferred embodiment of the control system of the present invention.

Throughout the specification and figures, like reference numerals refer to like components or parts. Referring first to FIG. 1, a preferred embodiment of the electronic control system 10 for a hydraulically actuated electronically controlled unit injector fuel system is shown. The control system includes an electronic controller 15, which in the preferred embodiment is a microcontroller 20. The microcontroller 20 used in the preferred embodiment is a Motorolla microcontroller, model no. 68HC11. However, many suitable controllers may be used in connection with the present invention as would be known to one skilled in the art.

The electronic control system 10 includes hydraulically actuated electronically controlled unit injectors 25*a–f* which are individually connected to outputs of the controller 20 by electrical connectors 30*a–f* respectively. In FIG. 1, six such unit injectors 25*a–f* are shown illustrating the use of the electronic control system 10 with a six cylinder engine 55. However, the present invention is not limited to use in connection with a six cylinder engine. To the contrary, it may be easily modified for use with an engine having any number of cylinders and unit injectors 25. Each unit injector 25*a–f* is associated with an engine cylinder, as is known in the art. Thus, the preferred embodiment shown in FIG. 1 could be easily modified for operation with an eight cylinder engine by adding two unit injectors 25 for a total of eight such injectors 25.

Hydraulic actuator fluid provides mechanical pressure to controllably open the unit injectors 25 and thereby inject fuel into an engine cylinder. In a preferred embodiment the hydraulic actuator fluid comprises engine oil. Low pressure oil is pumped from the oil pan 35 by a low pressure pump 40 through a filter 45, which filters impurities from the engine oil. The filter 45 is connected to a high pressure fixed displacement supply pump 50 which is mechanically linked to, and driven by, the engine 55. High pressure hydraulic actuator fluid (in the preferred embodiment, engine oil) enters the conduit 60 connected to the output 65 of the high pressure supply pump 50. One end of the conduit 70 is connected to the conduit 60 and the opposite end is connected to an injector actuation controller 75. The actuation controller 75 and the fixed displacement pump 50 are shown as distinct components. However, a single component including both features could be readily and easily substituted. Such components are well known in the art.

In a preferred embodiment, the injector actuation controller 75 comprises the fixed displacement pump 50 connected to an injector actuation control valve 76. Other devices, which are well known in the art, may be readily and easily substituted for the fixed displacement pump 50 and the injector actuation control valve 76. For example, one such device includes a variable displacement pump.

In a preferred embodiment, the combination of the control valve 76 and the fixed displacement pump 50 permits the microcontroller 20 to maintain a desired pressure of hydraulic actuator fluid in the conduits 70, 60, 90. The injector actuation control valve 76 is connected to the microcontroller 20 by an electrical connector 80. An injector actuation pressure sensor 95 is associated with the conduit 90 and produces an output signal over the electrical connector 100 connected to the microcontroller 20. The microcontroller 20 maintains closed loop control over the pressure of the hydraulic actuator fluid in conduit 90, in part, by sampling the output pressure signal on connector 100 of the pressure sensor 95.

The microcontroller 20 calculates a desired hydraulic actuator pressure as a function of engine speed, desired amount of fuel to be injected, and other engine parameters. The calculation of a specific desired hydraulic actuator pressure is beyond the scope of the present invention and is not further discussed. In a preferred embodiment, the desired hydraulic actuator pressure is between 5 MPa to 23 MPa, although other pressures may also be used.

The hydraulic actuator pressure in the conduit 90 supplying the unit injectors 25*a–f* is a function of the signal sent by the microcontroller 20 to the control valve 76 over connector 80. As noted above, the controller implements a closed loop control of the hydraulic actuator pressure. Thus as is known in the art, the signal sent by the microcontroller 20 over connector 80 to the injector actuation control valve 76 is a difference signal that is a function of the difference between the desired hydraulic actuator pressure, as calculated by the microcontroller 20, and the feedback signal from the pressure sensor 95 over connector 100.

A check valve 85 is connected to the conduit 60, 90. An injector actuation pressure sensor 95 is associated with the conduit 90 and produces an output signal over the electrical connector 100 connected to the microcontroller 20. The microcontroller 20 also receives other sensor signals 105 indicative of engine operating parameters. For example, in a preferred embodiment of the present invention, a camshaft speed/timing signal 110 is an input to the microcontroller 20 from the camshaft speed/timing sensor 56 associated with the engine. Also provided as inputs to the microcontroller 20 may be signals such as coolant temperature 115 from a coolant temperature sensor, boost pressure 120 from a boost pressure sensor, and atmospheric pressure 125 from an atmospheric pressure sensor. The sensors for these signals are not shown in FIG. 1. However, the use of such sensors in connection with an engine is well known in the art. One skilled in the art could easily and readily implement such sensors in connection with an engine using the present invention. As is more fully explained in the Glassey patent, the quantity of fuel injected by a unit injector 25*a–f* into a specific engine cylinder is a function of the individual driver signal delivered to the injector 25 by the microcontroller 20 over the respective electrical connector 30*a–f* and the pressure of the hydraulic actuator fluid in the conduit 90.

For example, the microcontroller 20 typically calculates the amount of fuel required to be injected into a specific engine cylinder according to certain sensed parameters including engine speed 110, boost pressure 125 and other signals as is known to those skilled in the art. The present invention does not relate directly to the calculation of the amount of fuel to be delivered. Thus, the specific calculations for determining the required amount of fuel will not be further discussed.

Figure 2A:
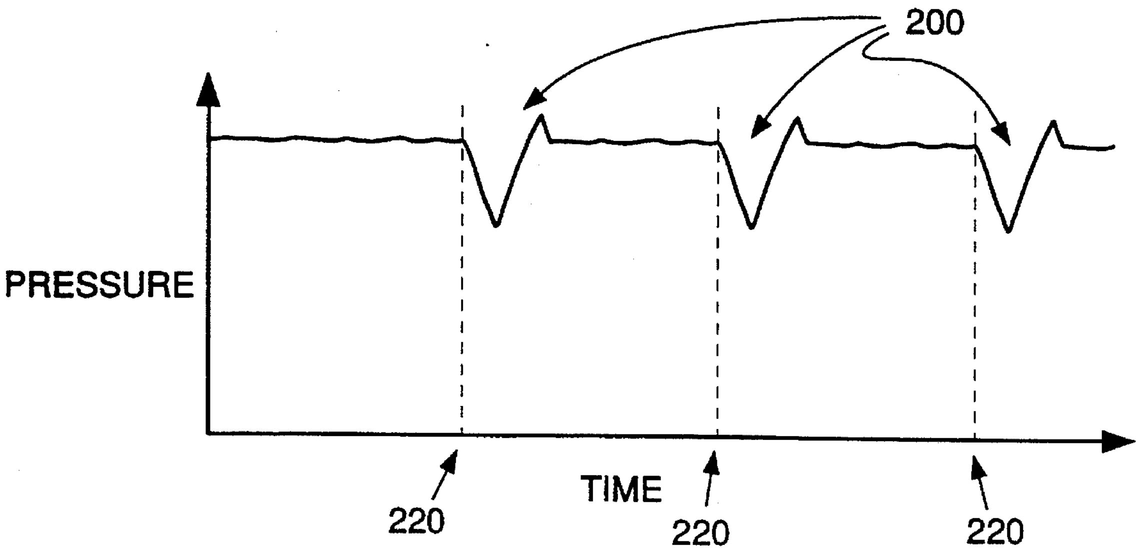
FIGS. 2*a* and 2*b* graphically illustrate the rail pressure in a preferred embodiment upon detection of a failed injector.
Figure 2B:
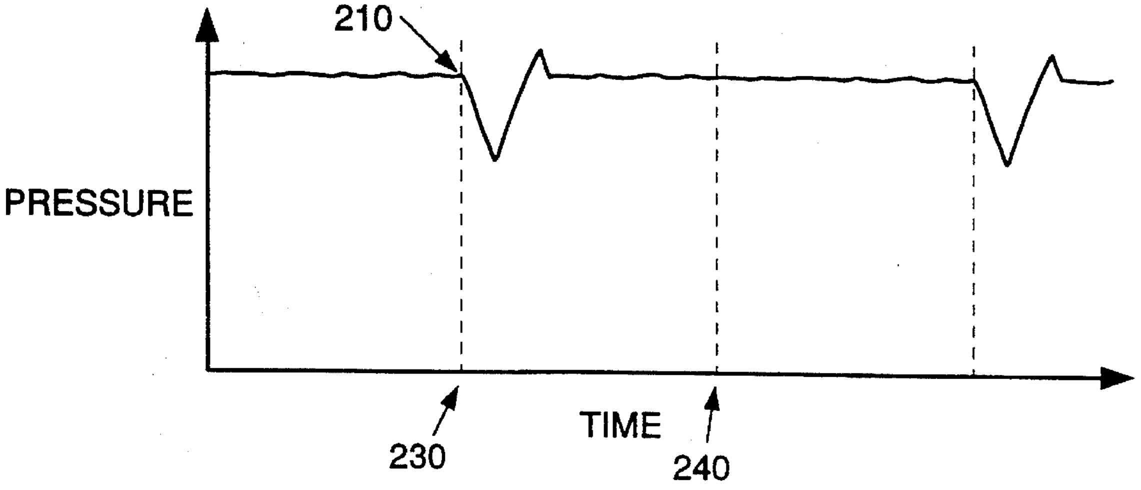

Referring now to FIGS. 2*a* and 2*b*, a graphical representation of the hydraulic actuator fluid pressure in conduit 90 is shown. FIG. 2*a* shows a graphic representation of the fluid pressure for normally firing injectors. FIG. 2*b* shows a graphic representation of the fluid pressure when one of the injectors fails to fire.

As shown in FIG. 2*a*, the hydraulic actuator fluid pressure includes a series of oscillations 200. Each oscillation is caused by an individual one of the injectors 25*a–f* opening to inject fuel into an engine cylinder. As is explained in the patent issued to Glassey, the microprocessor 20 issues a driver signal at a calculated time 220 over individual connectors 30*a*–30*f*. The driver signal commands a corresponding individual injector to open. When an individual injector opens, pressurized hydraulic actuator fluid escapes from the injector and returns to the hydraulic fluid supply which, in this case, is the engine oil pan 35. The released oil causes a small decrease in the actuator pressure in the conduit 90 which is represented by the oscillations 200. When all injectors are operating properly, the hydraulic pressure in conduit 90 will oscillate slightly (represented by element 200 in FIG. 2) following each of the driver signals issued by the microprocessor to the injectors. By monitoring the microprocessor driver signal and sampling the pressure sensor 95 signal for an oscillation 200, the microprocessor can determine whether all the injectors are firing properly. The microprocessor 20 verifies that an oscillation 200 has occurred by measuring a first pressure level in conduit 90 at about the time the microprocessor 20 issues a driver command and then calculating a second pressure level that is less than the first pressure level. In a preferred embodiment, the second pressure level is about 1 MPa less than the first pressure level, although other values could be used. The microprocessor 90 then samples the pressure sensor 95 signal and compares the sampled value to the second pressure level. Once a sampled value falls below the second pressure level, then an oscillation 200 has occurred. In this manner, the microprocessor 20 is able to sense an oscillation 200.

In contrast, FIG. 2*b* shows an application in which a hydraulic injector 25 has malfunctioned. In the figure, the microprocessor issues a first driver signal at a calculated time 230, which causes an injector to fire. The injector firing, in turn, causes a first oscillation 210. The microprocessor then issues a second driver signal 240 and again samples the signal from the pressure sensor 95. Because there is no oscillation in the pressure sensor 95 signal, the microprocessor 20 does not input a pressure signal indicative of an oscillation and therefore determines that the injector 25*a–f* failed to fire. The microprocessor can then use that information to cause a failure light to illuminate on an operator display panel or log the failure in a service memory device or process the failure information in some other manner.

By using an embodiment of the detection method and apparatus described and claimed herein, the present invention can determine when a particular injector has failed. The invention can thereby eliminate costly diagnostic procedures that would otherwise be required to evaluate the failure. Furthermore, the present invention may assist in preventing other forms of engine damage by alerting the operator or a service technician to the injector failure. In this manner the injector can be replaced before other damage can occur.

I claim:

1. A hydraulically actuated electronically controlled unit injector fuel system comprising:

a hydraulically actuated electronically controlled fuel injector;

a pressurized hydraulic actuator fluid connected to the hydraulically actuated electronically controlled fuel injector;

an electronic controller electrically connected to the hydraulically actuated electronically controlled fuel injector;

a first sensor associated with the pressurized hydraulic actuator fluid and connected to said electronic controller;

a second sensor associated with an engine parameter and connected to said electronic controller;

wherein said first sensor associated with the pressurized hydraulic actuator fluid produces a pressure signal;

wherein said electronic controller produces an injection signal in response to a sensed condition of said engine parameter and responsively inputs a first pressure level from said first sensor;

wherein said electronic controller calculates a second pressure level less than said first pressure level, periodically inputs said pressure signal from said first sensor and produces an injector fault signal in response to said pressure signal exceeding the second pressure level for at least a predetermined number of consecutive inputs; and wherein said electronic control does not produce said injector fault signal in response to said pressure signal falling below said second pressure level for at least one of said predetermined number of consecutive readings.

2. The hydraulically actuated electronically controlled unit injector fuel system according to claim 1, wherein said predetermined number of consecutive readings is calculated as a function of said sensed condition of said engine parameter.

3. The hydraulically actuated electronically controlled unit injector fuel system according to claim 1, wherein said second pressure level is at least 1 MPa less than said first pressure level.

4. A method of sensing a failed hydraulically actuated electronically controlled fuel injector used in connection with an internal combustion engine having a microprocessor electrically connected to the fuel injector, a hydraulic fluid pump connected to a fluid supply, said pump providing pressurized fluid to said injector, a pressure sensor associated with said pressurized hydraulic fluid and producing a pressure signal which is an input to said microprocessor, said microprocessor connected to a control valve wherein said microprocessor produces an error signal for controlling the pressure of said hydraulic fluid and said error signal is a function of a desired pressure and said pressure signal, said method comprising the steps of:

producing an injector driver signal;

injecting fuel into an engine cylinder in response to said step of producing an injector driver signal and measuring a first pressure level of said pressurized hydraulic fluid;

producing a second pressure level less than said first pressure level;

sensing a pressure of said pressurized hydraulic fluid at least a predetermined number of times in response to said step of producing an injector drive signal;

producing an injector failed signal in response to said pressure exceeding the second pressure level for all of said predetermined number of pressure values resulting from said step of sensing; and withholding said injector failed signal in response to said pressure being less than said second pressure level for at least one of said predetermined pressure values resulting from said step of sensing.

* * * * *